(12) United States Patent
Egelandsdal et al.

(10) Patent No.: US 6,227,864 B1
(45) Date of Patent: May 8, 2001

(54) DUMMY FOR PRACTICING CARDIOPULMONARY RESUSCITATION (CPR) OF A HUMAN BEING

(75) Inventors: Einar Egelandsdal, Forus (NO); Ove Aske, Mosteroy (NO); Larry T. McKinney, Katonah, NY (US); Russell R. Mohberg, Los Angeles, CA (US)

(73) Assignee: Asmund S. Laerdal A/S (NO)

( * ) Notice: Subject to any disclaimer, the term of this patent is extended or adjusted under 35 U.S.C. 154(b) by 0 days.

(21) Appl. No.: 09/142,552

(22) PCT Filed: Jan. 9, 1998

(86) PCT No.: PCT/DE98/00095

§ 371 Date: Sep. 9, 1998

§ 102(e) Date: Sep. 9, 1998

(87) PCT Pub. No.: WO98/30994

PCT Pub. Date: Jul. 16, 1998

(30) Foreign Application Priority Data

Jan. 9, 1997 (DE) .............................. 197 00 529

(51) Int. Cl.[7] .................................................. G09B 23/28
(52) U.S. Cl. ........................... 434/265; 434/267; 434/262
(58) Field of Search ................................... 434/265, 266, 434/267, 262

(56) References Cited

U.S. PATENT DOCUMENTS

| 3,154,881 | * | 11/1964 | Elwell | 446/24 |
|---|---|---|---|---|
| 3,199,225 | * | 8/1965 | Robertson et al. | 434/265 |
| 3,872,609 | | 3/1975 | Smrcka . | |
| 3,994,075 | * | 11/1976 | K-hnke | 434/265 |
| 4,001,950 | * | 1/1977 | Blumensaadt | 434/265 |
| 4,802,857 | * | 2/1989 | Laughlin | 434/265 |
| 4,984,987 | | 1/1991 | Brault et al. . | |
| 5,055,052 | * | 10/1991 | Johnson | 434/265 |
| 5,423,685 | * | 6/1995 | Adamson | 434/265 |
| 5,540,592 | * | 7/1996 | Scheinberg et al. | 434/265 |
| 5,628,633 | * | 5/1997 | Lehman | 434/265 |
| 5,823,787 | * | 10/1998 | Gonzalez et al. | 434/265 |

FOREIGN PATENT DOCUMENTS

4201777A1    7/1993  (DE) .

* cited by examiner

*Primary Examiner*—Sam Rimell
*Assistant Examiner*—Bena B. Miller
(74) *Attorney, Agent, or Firm*—Kenyon & Kenyon

(57) ABSTRACT

A dummy for practicing cardiopulmonary resuscitation (CPR) of a human being has a simulation of the thorax in the form of a torso, a head simulation and a trachea/lungs simulation in the form of a bag. The thorax simulation formed by the torso is made of an elastically compressively deformable foam and further includes a chest plate accommodated under the chest side of the torso. The back of the torso is shaped to provide support bodies, such that compressive deformation of the foam of the torso and flexural deformation of the chest plate upon compression in the context of cardiac massage jointly simulate the natural deformation of a human thorax. That design can allow the dummy to be economically produced in spite of a realistic simulation and natural deformation characteristics.

34 Claims, 8 Drawing Sheets

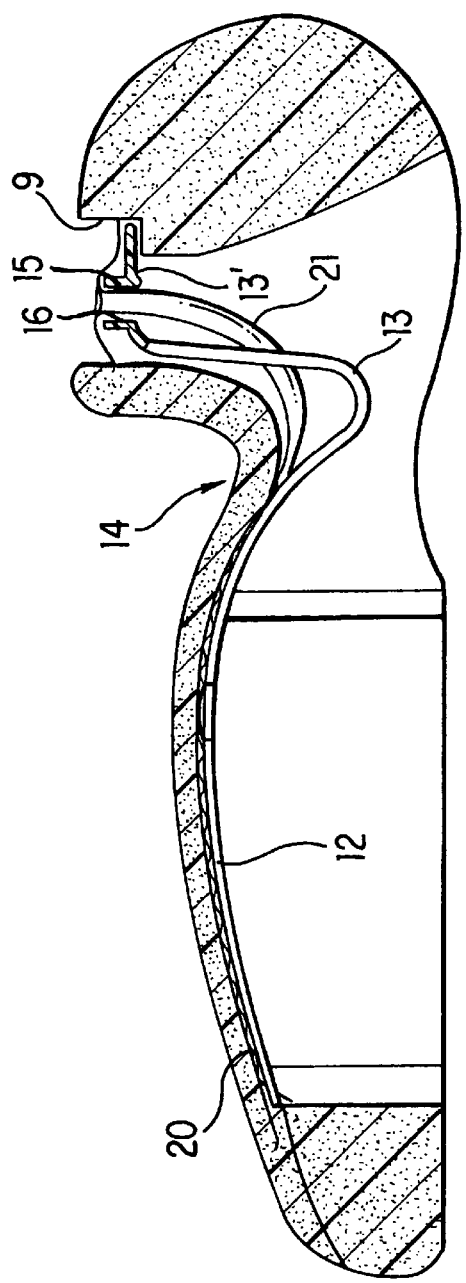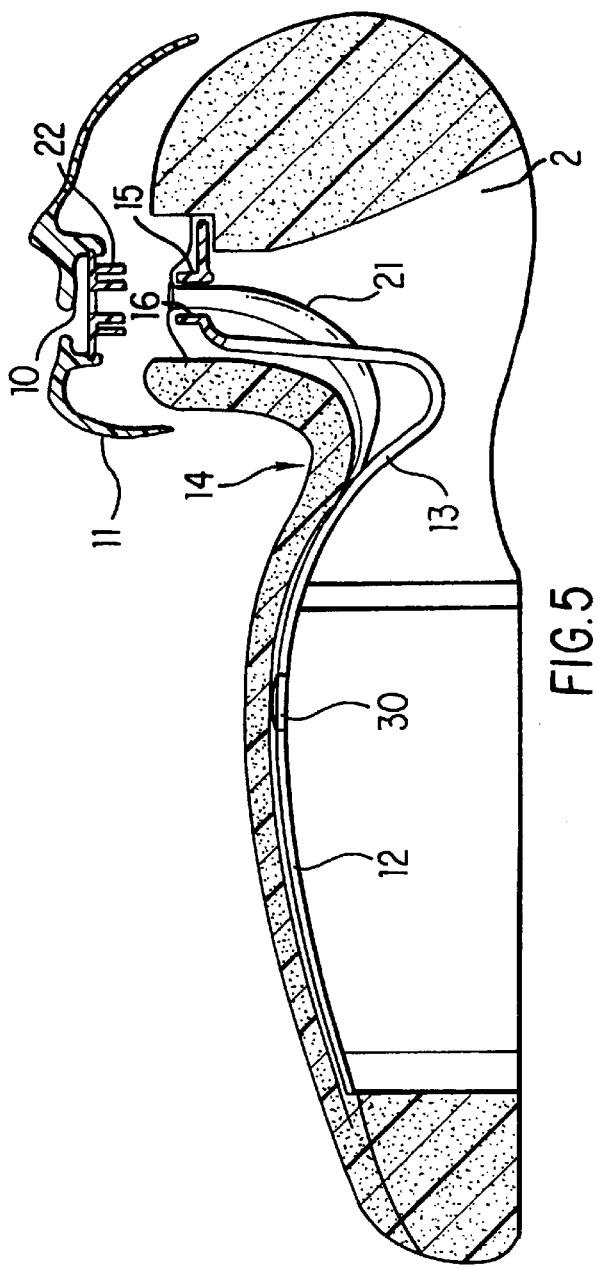

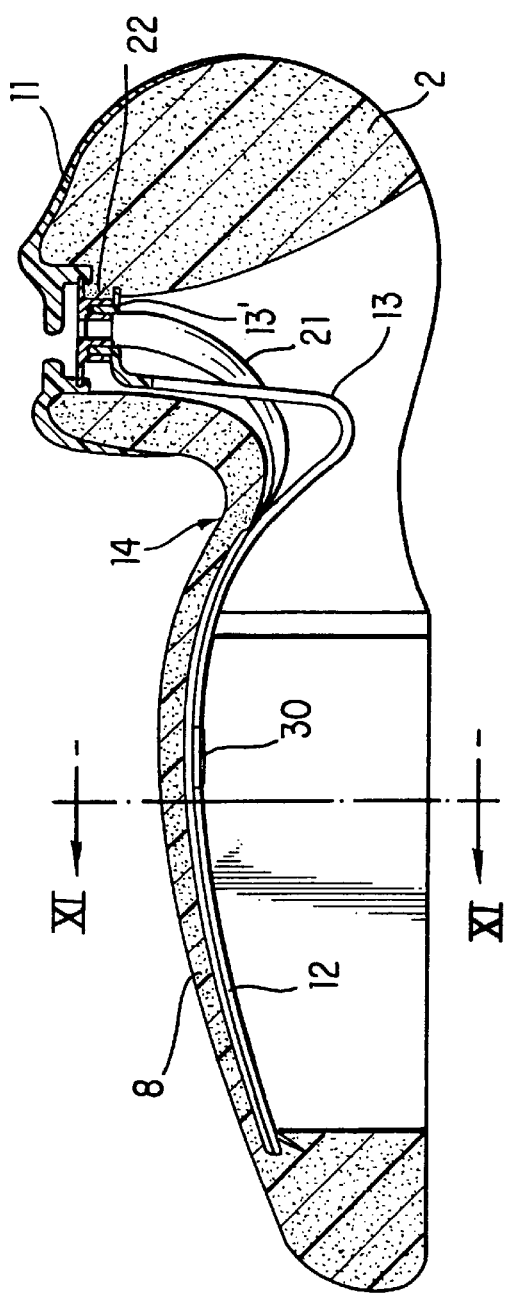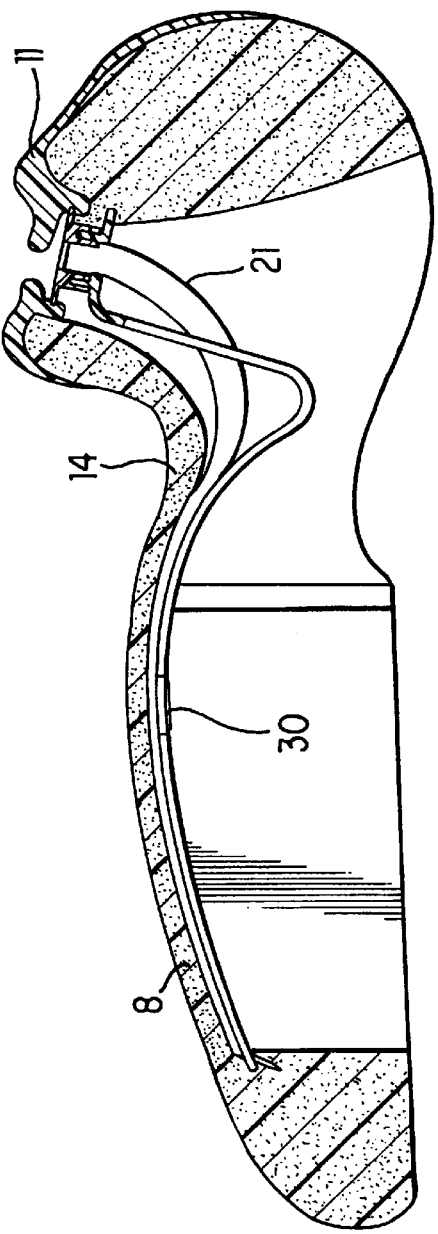

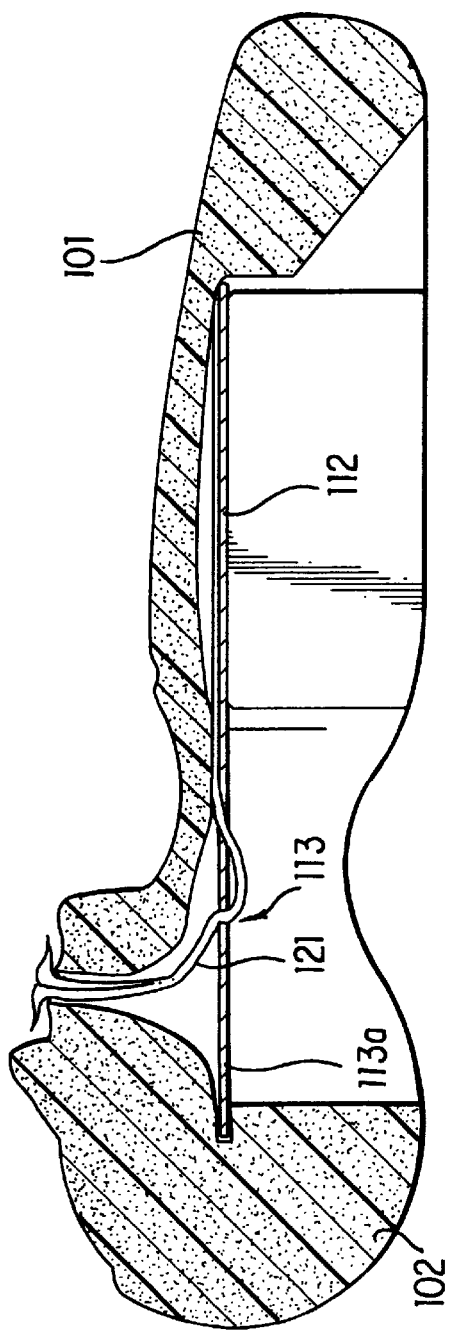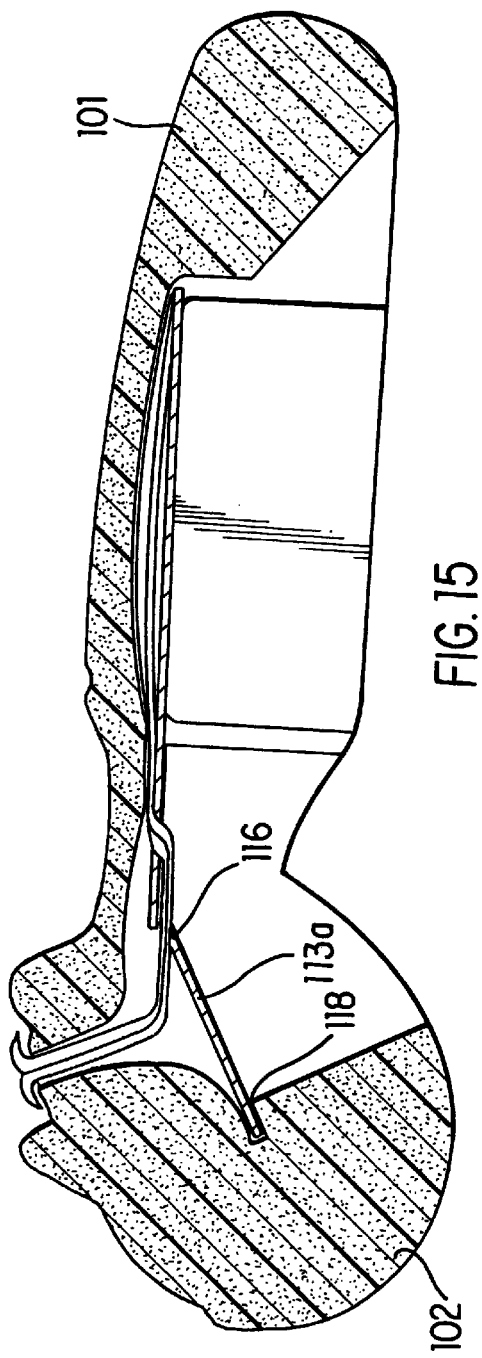

DUMMY FOR PRACTICING CARDIOPULMONARY RESUSCITATION (CPR) OF A HUMAN BEING

BACKGROUND OF THE INVENTION

The invention relates to a dummy for practising cardiopulmonary resuscitation (CPR) of a human being, including simulations of the head, lungs and thorax of a human being. The lungs are simulated by a bag, and the thorax has the structure of foam and is made of flexurally elastic material.

Satisfactory mastery of CPR presupposes adequate training. As CPR, that is to say heart massage and artificial respiration, cannot be practised on a healthy human being, dummies have long been known, that is to say simulations at least of the upper body and the head of a human being, on which CPR is learnt and practised. Correct performance of CPR naturally makes a clearer and longer-lasting impression on the person learning or practising CPR, the more the performance of the training dummy, in terms of heart massage and artificial respiration but also in regard to the preparatory procedures for that purpose, approaches the behaviour of the human body. The known dummies of the kind set forth in the opening part of this specification (see the prospectus 'Resusci Anne' from Laerdal) have for that purpose at least a simulation of the thorax, head and lungs, while a spring means is disposed in the thorax simulation to simulate the compression resistance of the thorax and the lungs simulation is a flat bag which is communicated with a mouth opening of the head simulation. The lungs bag is disposed in the thorax in such a way that, when air is blown into the bag, the bag causes a visible lifting movement of the front side of the thorax. In addition the known dummy includes means to provide that, when effecting mouth-to-mouth respiration, air is blown in against a resistance which corresponds to the respiration resistance of the human lungs, and that furthermore artificial respiration is not possible when the head simulation assumes a position which, in the case of a human being, would result in blockage of the airways and thus ineffective artificial respiration. Furthermore the face simulation is of such a realistic configuration that, when carrying out mouth-to-mouth artificial respiration, the person learning or practising the procedure is obliged to close the nose openings of the face simulation by clamping them shut, as is also required when dealing with artificial respiration for example of an accident casualty.

The known dummies which comply with those requirements are comparatively expensive to produce and therefore costly. Therefore it was and is hitherto the practice for CPR to be learnt and practised under the guidance of expert personnel, for example doctors, in institutes which possess a training dummy of that kind. As correct mastery of CPR however presupposes constant practice, learning success is in many cases lower than is desirable.

In order to remedy that problem, a dummy has already been developed, which requires a very low level of manufacturing expenditure and which is therefore so cheap that it can be acquired even by individuals for the purposes of practising CPR at home (U.S. Pat. No. 4,984,987). That dummy has a simulation of the thorax in the form of a plastic plate which is bent rearwardly at the 'shoulders' so that it forms a front wall and a rear wall. Inserted between the front and rear walls is a spring device so that, when carrying out heart massage, the front wall of the dummy can be pressed in against elastic resistance. Fixedly inserted into the 'shoulder region' of the plate can be a hollow head simulation of plastic material, which has a mouth opening and, at its lower end, a connection for fixing a lungs bag comprising sheet material.

That known dummy is admittedly very cheap to produce by virtue of the above-indicated construction so that it can be acquired even in the private sector for the purposes of practising CPR but—at any event with the exception of heart massage—it does not fulfil any of the requirements indicated in the opening part of this specification, which are absolutely essential for CPR to be satisfactorily learnt. Thus artificial respiration can be effected in the unchanged attitude of the head of the dummy so that the person learning the procedure may not remember firstly to put the head in the correct posture so that artificial respiration can have any success at all. Furthermore the person practising the procedure does not have any realistic control over the correct extent of respiration because blowing up the lungs bag when effecting artificial respiration cannot result in a visible lifting movement of the thorax simulation.

Furthermore, a dummy which is improved in terms of the specified requirements, for practising CPR, is also already known (DE 42 01 777 A1), in which the thorax simulation, in order to be able to produce it as inexpensively as possible, is in the form of a three-dimensional structure which is cut out of a flat foldable web material, for example corrugated paper or cardboard, along predetermined contour lines, and then folded along predetermined fold lines to provide the three-dimensional structure. It has been found however that although this known dummy is very inexpensive from the material point of view, it requires a not inconsiderable level of expenditure on tooling and equipment for stamping out and folding the three-dimensional structure. Overall therefore the production price of that known dummy cannot be held down to such a low level that it is used to a major extent in the private sector. In addition it has been found that the material used, in regard to tactile sensation, cannot approach that of the human upper body as is desired.

Finally, a dummy for practising CPR is known, which includes a torso comprising a foam material which is provided with a replaceable thorax simulation (U.S. Pat. No. 3,872,609). The torso is stiffened by a skeleton framework of wood and metal and the replaceable thorax simulation comprises an integral foam in which a simulation of the rib cage and the sternum comprising a hard but flexurally resilient plastic material is fixedly embedded. Arranged beneath that thorax simulation is a trachea/lungs simulation in the form of an inflatable bag.

In the known dummy, by virtue of the elasticity of the rib cage and the foam, that thorax simulation affords a deformation behaviour pattern which is similar to the human upper body. However a lift movement of the chest when performing artificial respiration cannot be simulated as the thorax simulation is fitted as a compact unit over the inflatable bag into an opening in the torso. Above all however the configuration of that known practice dummy is extremely expensive and costly so that once again it can only be purchased for group training in institutes or the like. Purchase and use in the private sector however are prohibited because of the necessarily high price.

Therefore the object of the present invention is to provide a dummy for practising CPR whose appearance and behaviour in terms of heart massage and artificial respiration is better adapted to that of the human upper body and which in particular involves such a low level of manufacturing cost and consequently low price that it can also be purchased by private persons for practising CPR at home.

SUMMARY OF THE INVENTION

According to the invention that object is attained by providing a dummy for practicing cardiopulmonary resuscitation (CPR) on a human being that includes a simulation of the thorax and the head, and a bag to simulate the lungs. The thorax is made of a flexurally elastic material like a foam selected to be elastically and compressively deformable. A chest plate is accommodated behind a chest side, and that the back of the torso forms support bodies, wherein the compressive deformation of the foam upon compression in the context of cardiac massage simulates the natural deformation of a human thorax.

The invention is based on the realisation that the combination of a torso which entirely consists of foam and a flexurally elastic plate which is accommodated in the torso makes it possible substantially to simulate the deformation characteristics of a human body without the need for a realistic simulation of a rib cage. As more specifically in accordance with the invention the thorax simulation is formed as a whole by the torso, forming not just a part thereof as in the case of the above-described known dummy, the elastic compressive deformability of the torso back which is in the form of a support means on the underlying support, in conjunction with the chest plate accommodated in the torso, results in a total deformation which, by suitable matching or adaptation of the foam body, approximates to the behaviour of the human upper body. As moreover the chest plate is not visible at the chest side but is accommodated at a given spacing therebeneath in the foam body of the torso, the external configuration and the feel of the torso can be substantially matched to those of the human upper body.

The compression characteristics of the torso can be particularly easily approximated to the characteristics of the human upper body when provided in the 'back' of the torso is an opening which extends in respect of the depth thereof preferably as far as the chest plate. For, in that case, the chest plate bridges over the opening in the transverse direction, possibly also in the longitudinal extent thereof, and in so doing is supported at the edge portions thereof, which are in opposite relationship in the transverse direction. Compression when practising heart massage therefore results in flexural deformation of the chest plate in the central region thereof and at the same time results in compressive deformation of the edge regions of the rear opening, which are disposed in mutually opposite relationship in the transverse direction and which in this case form the support bodies for supporting the torso on the underlying support surface. That means that, in spite of the plate being of a configuration which is simple in comparison with a rib cage, the torso is pressed in at the chest side, in a manner which is very closely adapted and matched to the deformation characteristics of the rib cage.

The foam body of the torso which is desirably in the form of an integral foam body can be produced as a unit in a simple molding or casting process; production of the chest plate which can comprise plastic material is of an equally simple and therefore inexpensive nature.

Furthermore, arranging the chest plate behind the chest side of the torso affords a life-like arrangement of the trachea/lungs simulation in the form of a bag as it can be disposed between the chest wall of the torso and the plate. For that purpose the front side of the plate must be appropriately accessible. That can be achieved if the chest side of the torso can be swung open over the chest plate in the manner of a cover. In accordance with the invention however, in the described embodiment with a rear opening, the opening is preferably of such a configuration that the chest plate can be inserted into the opening from the rear together with the trachea/lungs simulation secured thereto. For that purpose the opening is of such a configuration that with its edge regions it engages over the lateral edge portions of the chest plate so as to produce the support effect referred to hereinbefore.

As, in this arrangement, the trachea/lungs simulation is disposed in front of the plate and only a little behind the chest side of the torso, it can be supported on the chest plate when artificial respiration is being effected and the chest side of the torso can arch up in a true-to-life fashion. There is no need for any special measures from a technical point of view, for that purpose.

In accordance with a further advantageous configuration it is provided that the head simulation of the dummy also comprises foam and is integral with the torso. The opening on the rear side of the torso in this case also extends into the region of the nape of the neck of the head simulation to such an extent that it is in communication with the mouth opening of the head simulation and the chest plate is provided with a neck-like extension portion which also extends along the opening into the head simulation and which is angled in the region of the mouth opening towards the latter. Accordingly, the tubular extension, forming the trachea simulation, on the bag representing the trachea/lungs simulation, can extend along the neck-like extension portion as far as the mouth opening and can there be fixed to the extension portion. For that purpose, the free end of the extension portion desirably has a fixing means. The above-described configuration of the chest plate makes it possible for the extension portion thereon to be brought to bear against the chest and neck region of the torso, which is disposed in front thereof, in such a way that the trachea simulation which is disposed therebetween is clamped and thereby shut off, in the normal position of the head. However, when the head is pivoted backwardly as is necessary for respiration, the extension portion is also bent rearwardly and thereby comes free from its contact against the chest and neck region of the torso, which is disposed in front thereof. Furthermore, the elastic foam material is elastically stretched in that region by virtue of the head being pivoted rearwardly, and is thereby lifted away from the extension portion. Accordingly, a realistic behaviour in terms of artificial respiration procedure can be achieved in a very simple manner on the dummy according to the invention, and separate protection is claimed therefor:

BRIEF DESCRIPTION OF THE DRAWINGS

Further advantages and features of the invention will be apparent from the following description of embodiments with reference to the accompanying drawings and from further appendant claims. In the drawings:

FIG. 4 is a view in longitudinal section through the dummy with the inserted chest plate and the trachea/lungs simulation accommodated therein, FIG. 5 is a view corresponding to FIG. 4 with the association of a face mask in the stage of being fitted in position, FIG. 6 is a view corresponding to FIGS. 4 and 5 with the face mask fixed to the head simulation, FIG. 7 is a view corresponding to FIG. 6 with a head simulation tilted rearwardly for the purposes of performing artificial respiration, FIG. 14 is a view in longitudinal section similar to FIG. 6 through the modified embodiment of the dummy according to the invention with the inserted chest plate and the trachea/lungs simulation accommodated therein, with the chest plate in the position of closing the trachea, FIG. 15 is a view corresponding to FIG. 14 with the head simulation tilted rearwardly for the purposes of artificial respiration, and illustrating the chest plate in a position of opening the trachea, and FIGS. 16 and 17 each show a detail from FIGS. 14 and 15 respectively on a larger scale.

DETAILED DESCRIPTION OF THE INVENTION

Insofar as the directional references 'front' or 'rear' are used in the description hereinafter, they are to be interpreted in relation to the upright posture of the human upper body.

Figure 1:
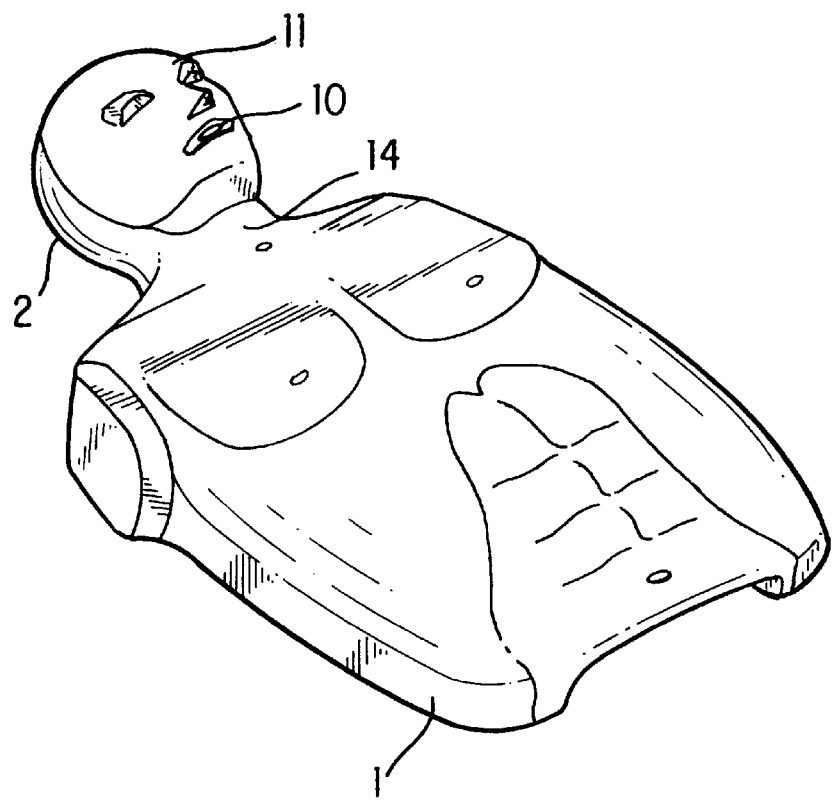
FIG. 1 is a perspective view from the front of a dummy according to the invention.
Figure 2:
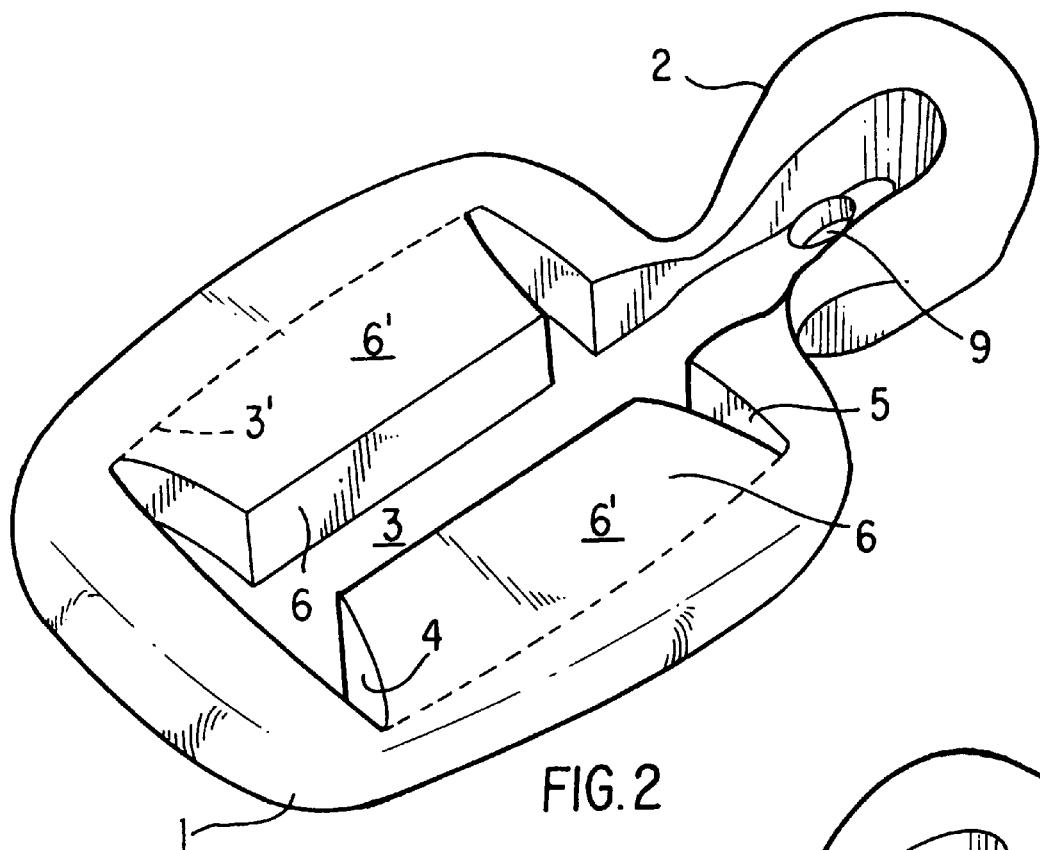
FIG. 2 is a perspective view from the rear of the dummy shown in FIG. 1, illustrating an opening in the rear thereof.
Figure 3:
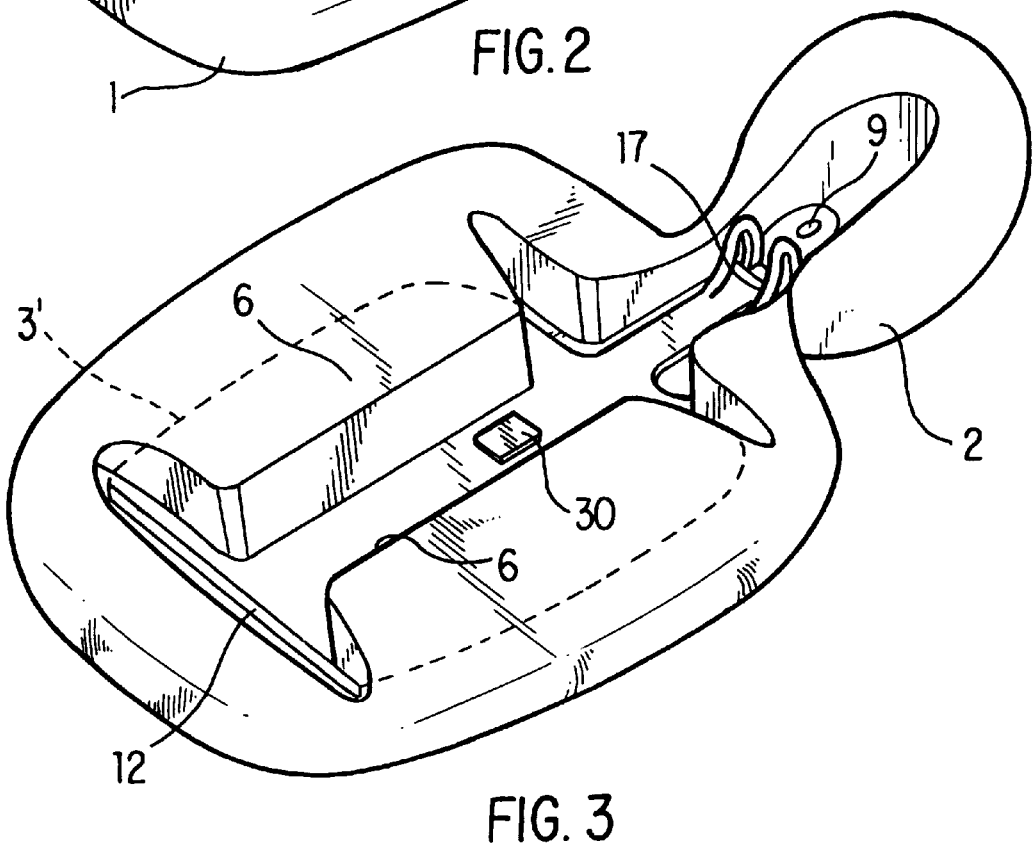
FIG. 3 is a perspective view corresponding to FIG. 2 with a flexurally elastic chest plate which is fitted into the opening.

As can be seen from FIGS. 1 through 3, the dummy according to the invention for practising CPR includes a thorax simulation in the form of a torso 1 and a head simulation 2 which is unitary in respect of material with the torso 1. The front chest side of the torso 1 is of a configuration which substantially corresponds to that of a human upper body. The torso 1 and the head simulation 2 which is connected thereto together form an integral foam body comprising a foam which is sufficiently elastic to reverse again the compressive deformation which occurs when heart massage is implemented, after the corresponding loading is removed.

Figure 11:
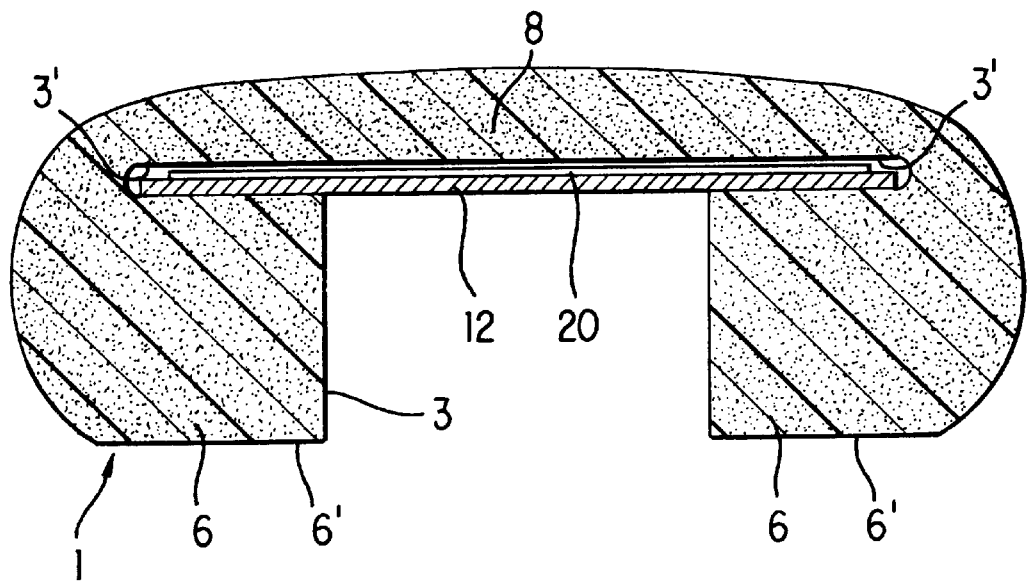
FIG. 11 is a view in section taken along line XI—XI in FIG. 6.

Referring to FIGS. 2 and 3, the torso 1 and the head simulation 2 have on the rear side an elongate, channel-like opening 3 which extends along a notional spinal column of the torso 1 and into the rear head region of the head simulation 2. At the lower end and in the shoulder region the opening 3 is locally enlarged by transverse channels 4 and 5 respectively; in addition the opening 3 extends as far as the ends of the transverse channels 4 and 5 respectively, in the portion thereof which is between the transverse channels 4 and 5, in the form of a slit-shaped opening 3' (FIG. 11). That arrangement provides that the back of the torso 1 is of such a configuration as to afford support bodies 6 which delimit the opening 3 on the portion thereof which is between the transverse channels 4, 5. With their rear sides the support bodies 6 form support surfaces 6' with which the dummy, in use in the appropriately normal fashion, lies on an underlying support surface (not shown) and is supported thereon. The depth of the opening 3 in the portion between the transverse channels 4, 5 is such that the front chest side 8 of the torso 1 involves a wall thickness of only between about one-sixth and one-eighth of the total depth of the torso 1.

Above the upper transverse channel 5 the opening 3 extends through the region of the nape of the neck of the head simulation in the back part of the head thereof, to such an extent that a communication is made there with a mouth opening 9, on the bottom of the opening 3. The mouth opening 9 corresponds to the mouth simulation 10 of a face mask 11 which can be fitted on to the head simulation 2.

The integral foam from which the torso 1 is made can be bent over forwardly in its lower portion along the transverse channel 4 to such an extent that thereby the slit portion 3' of the opening 3 becomes accessible in order to be able to insert a chest plate 12 (FIG. 8) under the support bodies 6 into the slit portion 3' of the opening 3. For that purpose the support bodies 6 which are in the form of blocks or cubes can also be lifted by virtue of the elastically yielding nature of the foam. FIG. 3 shows the usual position of the chest plate 12 in the torso 1 and the way in which it extends between the transverse channels 4 and 5.

The chest plate 12 is of a substantially rectangular configuration corresponding to the opening 3 including the slit portion 3' thereof, and has a neck-like extension portion 13 which extends into the region of the nape of the neck of the head simulation 12, to the level of the mouth opening 9. The chest plate 12 is curved in its longitudinal direction to correspond to the chest curvature of a human upper body and the neck-like extension portion 13 is curved rearwardly in the neck region 14 of the head simulation 2 and, approximately at the level of the mouth opening 9, is curved or angled sharply forwardly towards the mouth opening 9. At its free end the neck-like extension portion 13 forms a fixing plate 13' which is directed in substantially parallel relationship to the chest plate 12 and which has a holding opening 16 which corresponds to the mouth opening 9 and is bordered by a projecting rim 15. In the portion between the curvature in the rearward direction and the fixing plate 13', the extension portion 13 has a longitudinally extending slot 17.

Figure 8:
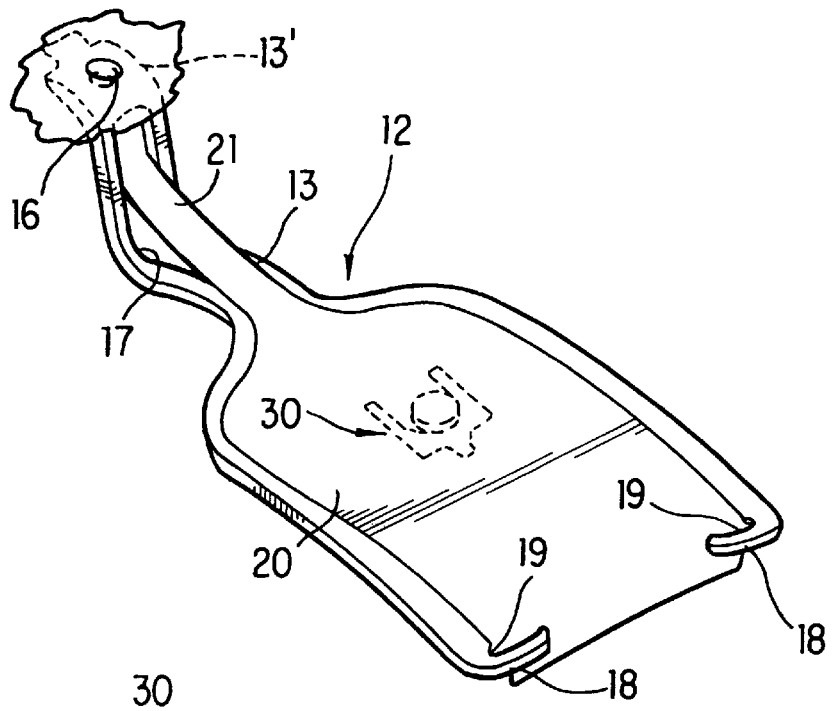
FIG. 8 is a diagrammatic view of the chest plate with a trachea/lungs simulation fixed thereto.

At its lower edge, the chest plate 12 has two holding hooks 18 which are directed towards each other and which, with the edge of the plate, define holding slots 19 which are in mutually opposite relationship. The holding hooks 18 and the holding slots 19 defined thereby serve for fixing a trachea/lungs simulation 20 in the form of a bag which comprises plastic sheet or foil and which is extended at its upper end in a tubular trachea simulation 21 (FIG. 8). In the condition of use the bag 20 lies on the front side of the chest plate 12 and thus behind the chest side 8 of the torso 1. The trachea simulation 21 extends along the extension portion 13 of the chest plate 12 and through the slot 17 therein as far as the holding opening 16 through which it is passed from the rear and is turned over around the holding rim 15, with its free end (FIGS. 4 and 5).

For the purposes of fixing thereof the face mask 11 includes a push-on fixing element 22 which is arranged in the mouth opening 10 or which is formed integrally with the face mask 11 and which can be pushed on to the projecting holding rim 15 on the fixing plate 13' (FIGS. 5 and 6). The push-on fixing element 22 engages around the holding rim 15 and the free end, which is turned thereover, of the trachea simulation 21, in a condition of elastic deformation, and thereby secures both the face mask 11 on the head simulation 2 and also the trachea simulation 21 to the fixing plate 13'. Making the true-to-life face mask 11 from elastomeric material, fixing same to a head simulation and the push-on connection thereof to a trachea simulation by way of a push-on connecting element are known in the state of the art and do not need to be described in greater detail here (see the Laerdal prospectus 'Resusci Anne' 15030EN).

After the face mask 11 has been fitted on, the dummy is in the condition intended for practising CPR. In that condition the neck region 14 of the head simulation 11 bears against the extension portion 13 of the chest plate 12 in such a way that thereby the trachea simulation 21 disposed therebetween is clamped and consequently air is prevented from passing therethrough. For that purpose, the rearward curvature of the extension portion 13 is of a. suitable size in relation to the opening 3 and in particular the slit portion 3' thereof. At its inward side which is towards the extension portion 13, the neck region 14 can possibly be provided with a local raised clamping portion (FIGS. 4 through 6). The trachea simulation 21 can be opened if the head simulation 2 is moved rearwardly from the unloaded condition as shown in FIGS. 4 through 6 by applying pressure to the chin, as is shown in FIG. 7. Due to the tilting movement on the one hand the neck region 14 is subjected to a tensile stress which results in stretching of the neck region 14 and a tendency for it to lift away from the extension portion 13. On the other hand the extension portion 13 itself is curved to a greater degree rearwardly by virtue of the bending moment which occurs. As a result the clamping condition of the trachea simulation 21, which existed previously, is nullified.

Figure 9:
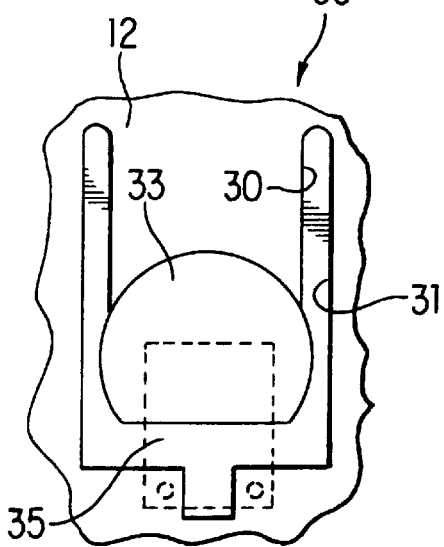
FIG. 9 is a detail view of a mechanical sound producer.
Figure 10A:
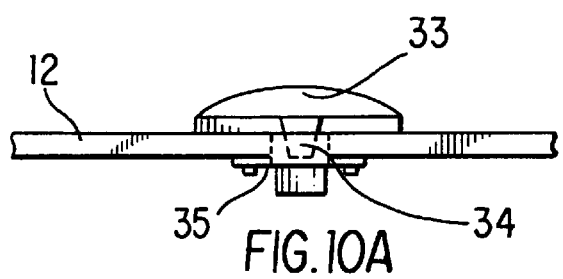
FIGS. 10a, 10b show a front view and a side view of the mechanical sound producer shown in FIG. 9.
Figure 10B:
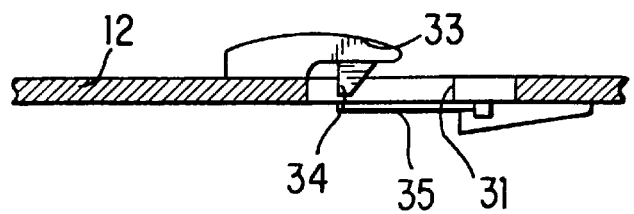

The chest plate 12 includes a mechanical sound producer 30 which is shown in greater detail in FIGS. 9 and 10. For that purpose, in a region corresponding to the lower end portion of the sternum in the human upper body, the chest plate 12 has a U-shaped aperture 31 therethrough, which defines the outline of a tongue 32. At its free end the tongue 32 carries a forwardly projecting pressure plate 33 having a rearwardly facing tooth 34. A metal blade 35 is fixed to the rear side of the chest plate 12 in such a way that, as can be seen from FIG. 10b, it projects into the aperture 31 to a position under the tooth 34. The metal blade 35 includes an impression (not shown) which provides that, when it is flexed downwardly, the metal blade 35 produces a clicking noise. Sound producers of that kind are known and therefore do not need to be described in greater detail here.

In the described embodiment, the chest plate 12 and the neck-like extension portion 13 which is in one piece therewith comprise a hard, flexurally elastic plastic material and are of a substantially uniform thickness throughout. It is however possible to envisage the thickness being locally increased in the region in which the mechanical sound producer 30 is arranged in order thereby to achieve an increased level of flexural stiffness for the tongue 32.

The mode of operation of the above-described dummy is as follows:

Starting from the condition shown in FIG. 6, the person practising CPR firstly places his hands in known fashion in the region of the lower portion of the sternum in order to implement cardiac massage. The person carrying out the training procedure can establish the correct position for the hands as the pressure plate 33 can be felt through the chest side 8 of the torso 1. Thereafter the compressions of the thorax simulation, which are necessary for cardiac massage, are effected. By virtue of the compressive deformability of the support bodies 6, the torso 1 opposes an elastic resistance to such compressions, to an extent which corresponds to the compressive deformability of the human thorax by virtue of the flexural elasticity of the ribs in the lateral curvature portion thereof. In this embodiment, superimposed on the resulting pressing-in movement of the chest side 8 of the torso 1 is a further pressing-in movement which occurs by virtue of the flexural elasticity of the chest plate 12. The chest plate 12 which bridges over the opening 3 (see FIG. 11) is supported in that case with its lateral portions on the support bodies 6. The overall compressive deformation of the torso 1, which occurs, therefore corresponds in nature to that of a human thorax. The extent of compressive deformation which occurs in that case in relation to the loading exerted is determined by the elastic resistance force of the foam material of which the support bodies 6 are made, and the resistance force which the chest plate 12 opposes to the flexural loading thereof.

In the course of the compressive loading the tongue 32 of the chest plate 12 also experiences deformation rearwardly, by virtue of which the tooth 34 on the pressure plate 33 is moved towards the metal blade 35 and finally strikes against it. The spacing of the tooth 34 from the metal blade 35 in the rest condition is such that it is only when the correct depth of compression of the torso 1 is reached that the tongue 32 is also bent rearwardly to such an extent that the metal blade 35 is sufficiently deflected to produce a clicking sound. The person practising the procedure can therefore acoustically monitor and control the intensity of his compressions and thus the correctness thereof.

The performance of CPR presupposes alternately cardiac massage and artificial respiration. After a given number of compressions therefore the person practising the procedure will perform artificial respiration blows by way of the mouth opening 10 in the face mask 11. For that purpose, correct artificial respiration on a human being presupposes a rearwardly inclined head posture in order to eliminate bending of the trachea which impedes or prevents air from flowing therethrough. In a corresponding fashion, in the case of the dummy according to the invention, the head simulation 2 must be pivoted rearwardly by applying a pressure to the chin and held in that position in order to nullify the clamping condition of the trachea simulation 21 in which air is prevented from passing therethrough (FIG. 7). The elastic stretchability of the foam in the neck region 14 which is determined there by the wall thickness and the flexural deformability of the extension portion 13 on the chest plate 12 are so matched that on the one hand the rearward movement of the head simulation 2 encounters a resistance which is also to be expected when carrying out the procedure on a human being, while on the other hand it can be implemented to a corresponding extent. The chest side 8 which is over the bag 20 is lifted in a life-like manner with elastic deformation thereof, which produces a corresponding resistance to blowing air into the bag.

FIGS. 12 through 17 show an embodiment of a dummy according to the invention, which is modified in comparison with the above-described embodiment and in which the torso 101 is of a substantially identical configuration to the torso 1 shown in FIGS. 1 through 11. The modification concerns the configuration of the chest plate 112 and the co-operation thereof with the trachea/lungs simulation 120.

Figure 12:
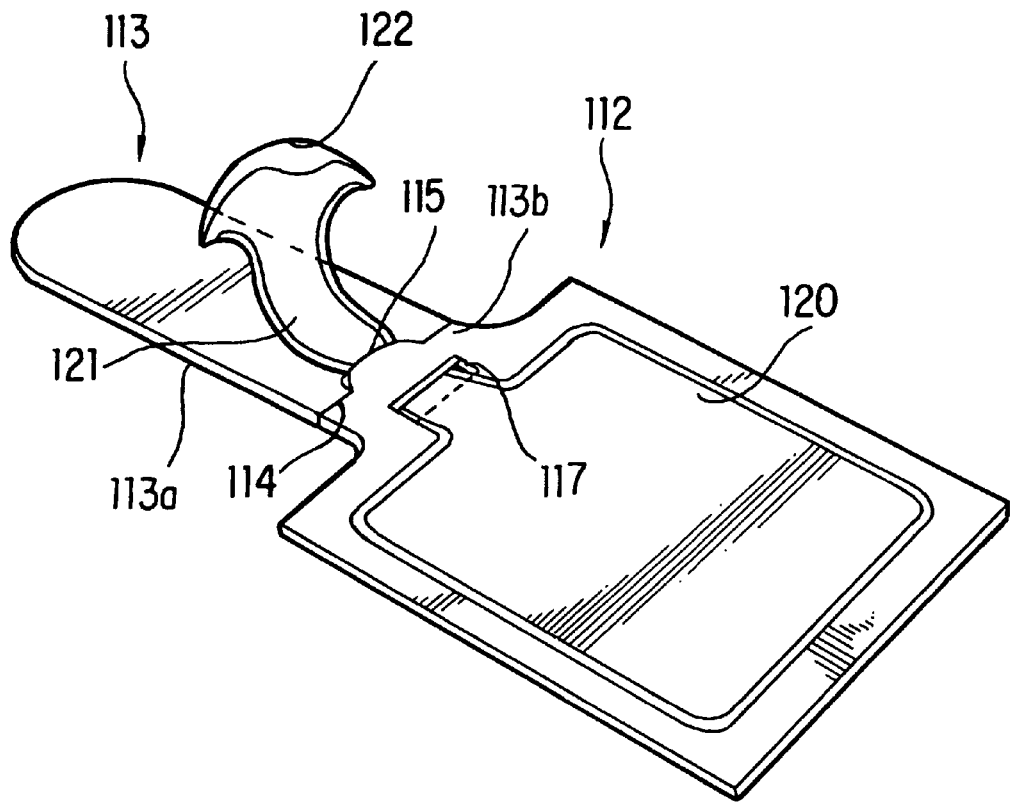
FIG. 12 is a diagrammatic view similar to FIG. 8 of the chest plate of a modified embodiment of a dummy according to the invention in a position of closing the trachea of the trachea/lungs simulation.
Figure 13:
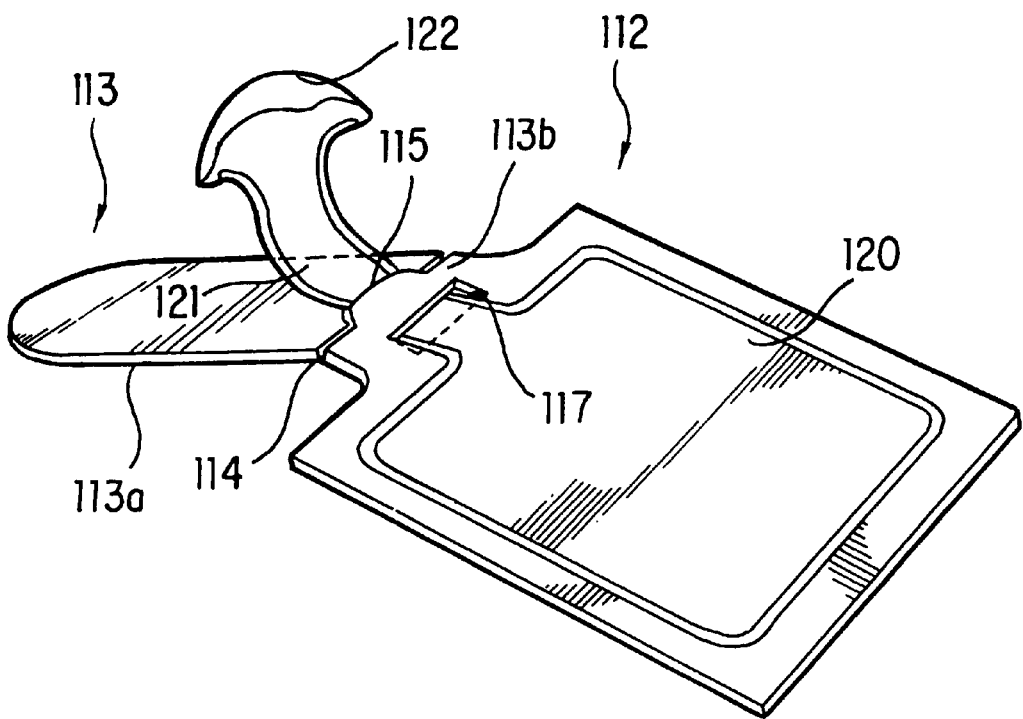
FIG. 13 shows the chest plate illustrated in FIG. 12 in a position of opening the trachea.

As shown in FIGS. 12 and 13 the chest plate 112 substantially comprises a largely flat and substantially rectangular plate comprising a flexurally elastic plastic material. In this case also the thickness of the chest plate 112 is so selected that the deformation thereof when performing the CPR procedure corresponds to the deformation of a human thorax. At the upper edge the chest plate 112 has a neck-like extension portion 113 which is subdivided into a pivotal portion 113a and a portion 113b which is formed integrally with the chest plate 112. The pivotal portion 113a is separated from the fixed portion 113b by a slit line 114 which extends rectilinearly through two of the mutually oppositely disposed side edges of the neck-like extension portion 113 and which describes a semicircular arc 115 over a central part of the width of the neck-like extension portion 113. In the region of the semicircular arc 115 of the slit line, the latter passes completely through the thickness of the plastic plate forming the neck-like extension portion 113 so that the pivotal portion 113a is completely separated along that part of the slit line from the fixed portion 113b. In the region of the rectilinear portions however the slit line is bridged over by a film hinge. In the illustrated embodiment, the film hinge is formed by the slit line not completely passing through the thickness of the plastic plate, but penetrating into the plastic material only as far as a predetermined depth, while retaining a residual depth in respect of the plastic material. Therefore each film hinge in the region of the straight portions of the slit line 114 forms an integral part of the pivotal portion 113a and the fixed portion 113b.

Approximately at the level of the upper edge of the chest plate 112 the fixed portion 113b of the neck-like extension portion 113 has a narrow rectangular, transversely extending aperture 117 whose width at least approximately corresponds to the width of the semicircular portion 115 of the slit line 114. The trachea simulation 121 extends through the aperture 117 so that it lies beneath the adjoining part of the fixed portion 113b and passes from below through the semicircular portion 115 of the slit line 114. The trachea simulation 121 is enlarged in a funnel-like configuration at its upper end 122.

At least in the semicircular portion 115 but desirably also in the straight film hinge portions, the width of the slit line 114 is such that the trachea simulation 121 is compressed when the pivotal portion 113a is generally disposed substantially in one plane with the fixed portion 113b and thus with the chest plate 112 (FIG. 12). In that position of the pivotal portion 113a the trachea simulation 121 is consequently closed, that is to say air cannot be blown into the lungs simulation 120.

Figure 17:
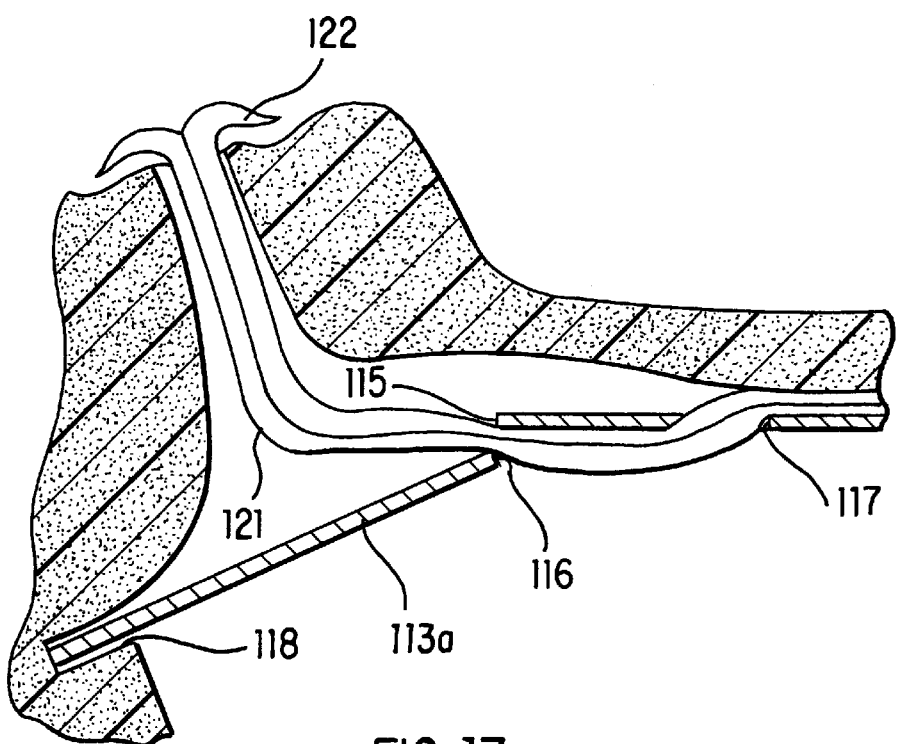

When the pivotal portion 113a is pivoted downwardly by means of the two film hinges (FIG. 13), the inwardly extending edge of the slit line of the pivotal portion 113a in the semicircular portion 115 moves away from the oppositely disposed projecting edge of the slit line of the fixed portion 113b and thereby opens an opening 116 (FIGS. 15 and 17). The opening 116 is formed by virtue of the pivot axis which is disposed behind or under the semicircular portion 115 and which is formed by the mutually aligned film hinges of the slit line 114. The passage through the trachea simulation 121 is opened when the pivotal portion 113a is in the pivoted position; air can therefore be blown into the lungs simulation 120.

Figure 16:
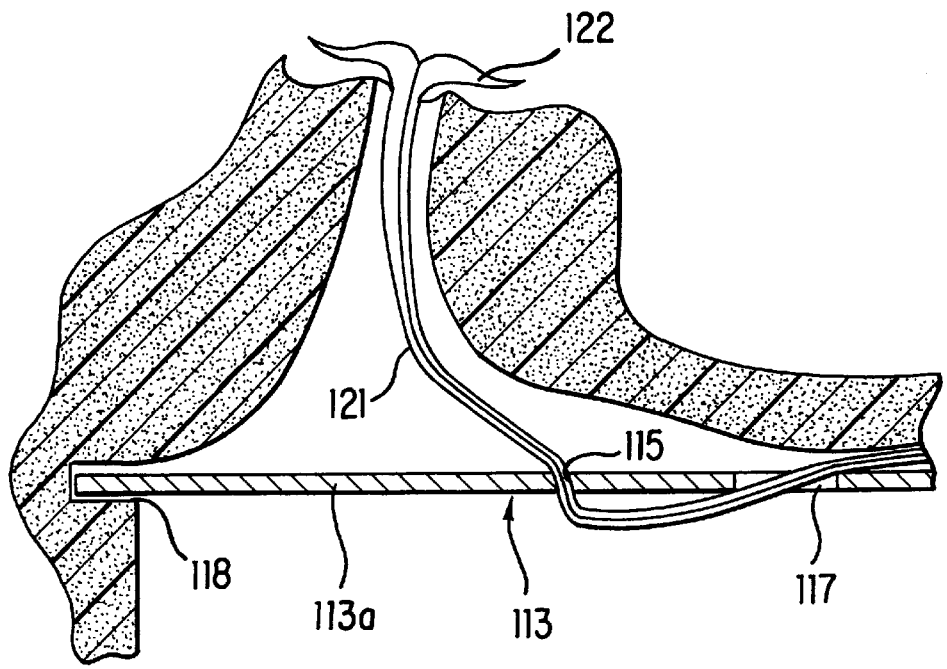

As can be seen from FIGS. 14 and 16, the neck-like extension portion 113 of the chest plate 112 with the pivotal portion 113a assumes a straight or elongated position when the head simulation 102 of the torso 101 assumes the normal position with respect to the thorax. In that condition the trachea simulation 121 is clamped in the semicircular portion 115 of the slit line 114 so that artificial respiration by blowing air into the lungs simulation 112 is not possible. When however as shown in FIGS. 15 and 17 the head simulation 102 is inclined emphatically rearwardly to correspond to proper implementation of the CPR-procedure, then the pivotal portion 113a which projects into an opening 118 in the interior of the head simulation 102 is entrained and thereby pivoted about the film hinges of the slit line 114. By virtue thereof, the above-described opening 116 is produced in the semicircular portion 115 of the slit line 114; the clamping condition of the trachea simulation 121 is nullified by virtue of the opening 116 and artificial respiration can now be effected by blowing air into the trachea simulation 112.

The above-described chest plate 112 of the modified embodiment of the dummy according to the invention is more advantageous in terms of production procedure and in respect of function than the chest plate 12 in accordance with the first-described embodiment. For, as a result of the neck-like extension portion 113 being in a substantially straight or elongated position with respect to the chest plate 112 in the initial condition, the latter can be overall produced from a flat plastic material, for example in a stamping process, while the slit line 114 can also be directly stamped therein. Furthermore, the clamping condition in respect of the trachea simulation 121 is determined solely by the pivotal position of the pivotal portion 113a because the trachea simulation 121 extends beneath the fixed portion 113b in the neck region of the torso 101 and as a result cannot be influenced by the neck region bearing against the fixed portion.

The embodiment shown in FIGS. 12 through 17 also differs from that shown in FIGS. 1 through 12 in that the simulation of the face is provided directly on the head simulation 102. For the purposes of artificial respiration therefore the enlarged end 122 of the trachea simulation 121 is passed through the mouth opening of the head simulation 102 and spread out around it (see FIGS. 14 through 17).

The invention is not limited to the embodiments described hereinbefore and illustrated. Thus, providing the dummy with the face mask 11 is not absolutely necessary for learning CPR. On the contrary as shown in FIGS. 14 through 17 the head simulation 2 can be formed directly with a face simulation, which does not result in a significant increase in cost by virtue of the simple manner of manufacture of the torso and the head simulation. In this case it is sufficient to enlarge the end 122 of the trachea simulation 121 or to provide an annular connecting element which corresponds to the push-on connecting element 22, in order to fix the free end of the trachea simulation 21 in the mouth opening 9 of the head simulation 2. In addition the mechanical sound producer 32 can be replaced, by a mechanical sound producer of another design configuration (for example in accordance with DE 42 01 777 A1). Instead of plastic material the chest plate 12 can also comprise metal and can be of a thickness which corresponds to the requirements demanded in terms of flexural elasticity, if that is wanted. If the chest plate is of a rigid nature, it is possible to envisage providing the sound producer 32 in the form of a separate insert, for example causing it to co-operate with a tongue which can be separately fitted into the chest plate and which is deformed independently of deformation of the chest plate.

In the modified embodiment of the dummy, the pivotability of the pivotal portion 113a is also not necessarily linked to the use of the described film hinges. On the contrary, they can be replaced by hinges of another kind, for example by strips which are glued to the rear side or underside of the pivotal portion 113a and the fixed portion 113b, or strips of an elastic flat material which act in the fashion of a leaf spring.

In regard to its deformation characteristics, the chest plate can be of such a design configuration that it participates in the overall deformation of the torso when compression is effected, insofar as the chest plate is flexurally elastic by virtue of suitable dimensioning and choice of material thereof. However, with suitable dimensioning and choice of material, the chest plate can also be deliberately kept rigid in comparison with the foam material adopted, so that in this case the overall deformation is practically exclusively compressive deformation of the back of the torso.

What is claimed is:

1. A dummy for practicing cardiopulmonary resuscitation (CPR) on a human being, comprising:
    a simulation of a human thorax in the shape of a human torso made of elastically compressible and deformable foam, the simulation having a chest side and a back side, the back side having a shape that provides support bodies;
    a chest plate located within the simulation of the thorax behind and approximately adjacent to the chest side of the simulation of the thorax, the chest plate being flexurally elastic and in communication with the support bodies;
    a simulation of a head coupled to said simulation of the thorax; and
    a simulation of human lungs located within the simulation of the human thorax.

2. A dummy as set forth in claim 1 wherein the chest plate is substantially rigid.

3. A dummy as set forth in claim 1 wherein the torso on its back side has an opening which is bridged over in the transverse direction by the chest plate.

4. A dummy as set forth in claim 1 wherein the chest plate carries a mechanical sound producer that, with the correct user hand position, gives a sound signal upon each adequate compression of the thorax simulation.

5. A dummy as set forth in claim 1 wherein the head simulation is formed in one piece with the simulation of the torso.

6. A dummy as set forth in claim 1 wherein the chest plate has fixing elements for fixing the lungs simulation.

7. A dummy as set forth in claim 1 wherein on its back side the torso has an opening having an edge region, the opening being bridged over in the transverse direction by the chest plate.

8. A dummy as set forth in claim 7 wherein the opening is elongate and extends in the longitudinal direction of the torso and the support bodies are formed by oppositely disposed edge regions of the opening.

9. A dummy as set forth in claim 8 wherein the opening extends in under the edge regions thereof in a slit configuration and accommodates the chest plate, wherein the edge regions of the opening engage over the rear side of the chest plate.

10. A dummy as set forth in claim 7 wherein the opening extends in under the edge region thereof in a slit configuration and accommodates the chest plate, wherein the edge region of the opening engage over the rear side of the chest plate.

11. A dummy as set forth in claim 10 wherein the chest plate is releasably accommodated in the opening.

12. A dummy as set forth in claim 11 wherein the edge region of the opening can be at least partially lifted to insert the chest plate into the torso.

13. A dummy as set forth in claim 10, wherein the opening in the back of the torso extends into the neck of the head simulation.

14. A dummy as set forth in claim 1, wherein the chest plate has a neck-like extension portion extending to a mouth opening of the head simulation, and wherein the lungs simulation is arranged between the chest side of the torso and the chest plate.

15. A dummy as set forth in claim 14 wherein the chest plate is curved in the longitudinal direction of the torso and the neck-like extension portion, having an end, is angled behind the mouth opening towards the mouth opening and the end of the neck-like extension portion contains an orifice.

16. A dummy as set forth in claim 15 wherein the end of the neck-like extension portion within the mouth opening is in the form of part of a push-on connection.

17. A dummy as set forth in claim 16 wherein the push-on connection is part of a face mask which can be fixed to the head simulation.

18. A dummy as set forth in claim 17 wherein the push-on connection is connected to a projecting rim located on the neck-like extension.

19. A dummy as set forth in claim 15 wherein the neck-like extension portion presses a trachea simulation extending along the extension portion of the chest plate, against the extension portion, and blocks the passage through the trachea simulation.

20. A dummy as set forth in claim 14 wherein the neck-like extension portion presses a trachea simulation extending along the extension portion of the chest plate, against the extension portion, and blocks the passage through the trachea simulation.

21. A dummy as set forth in claim 14 wherein the neck-like extension portion has a pivotal portion which is pivotally mounted to the chest plate and which in a rearwardly pivoted position forms an opening for the unimpeded passage of a trachea simulation but in the unpivoted position clamps the trachea simulation to close off the passage therethrough.

22. A dummy as set forth in claim 21 wherein the chest plate has an aperture for the trachea simulation to be passed therethrough on to the rear side of the chest plate, and that the trachea simulation passes through the opening formed in the pivotal position of the pivotal portion from the rear to the mouth opening.

23. A dummy as set forth in claim 22 wherein the pivotal portion is connected to the chest plate by way of a pair of hinges forming a pivot axis, and that provided between the mutually oppositely disposed edges of the pivotal portion and the chest plate is a slit which is arranged at a spacing from said pivot axis and in which the trachea simulation is clamped in the unpivoted position of the pivotal portion.

24. A dummy as set forth in claim 21 wherein the pivotal portion is connected to the chest plate by way of a pair of hinges forming a pivot axis, and that provided between the mutually oppositely disposed edges of the pivotal portion and the chest plate is a slit which is arranged at a spacing from said pivot axis and in which the trachea simulation is clamped in the unpivoted position of the pivotal portion.

25. A dummy as set forth in claim 24 wherein the slit is semicircular.

26. A dummy for practicing cardiopulmonary resuscitation (CPR) on a human being, comprising:
   a simulation of the thorax in the shape of a torso made of elastically compressible foam having a chest side behind which is a chest plate;
   a simulation of the head connected to the simulation of the thorax;
   a simulation of the trachea and lungs comprising a bag;
   wherein the simulation of the trachea and lungs is located between the chest side of the torso and the chest plate, and between a neck region of the simulation of the head and the chest plate, in such a way that in a normal posture of the simulation of the head the simulation of the trachea and lungs is clamped, but the simulation of the trachea and lungs is opened when the head simulation is pivoted back.

27. A dummy as set forth in claim 26 wherein the chest plate is made of rigid material.

28. A dummy as set forth in claim 26 wherein the chest plate contains holding hooks.

29. A dummy as set forth in claim 26 wherein the chest plate contains a mechanical sound producer.

30. A dummy as set forth in claim 26 wherein the simulation of the thorax has support bodies.

31. A method of training cardiopulmonary resuscitation comprising:
   (a) providing a simulation of a head and thorax made of elastically compressible foam, the simulation of the head and thorax having a chest side behind which is a chest plate, the simulation of the head and thorax also having a simulation of the trachea and lungs comprising a bag; and
   (b) pivoting the simulation of the head and thorax to unclamp the simulation of the trachea and lungs located within the simulation of the head and thorax.

32. The method of claim 31 wherein the chest plate contains a hinge.

33. The method of claim 31 wherein the simulation of the head and thorax has a back side, the back side containing an opening, the opening having edges which define support bodies.

34. The method of claim 31 wherein the chest plate contains a mouth opening.

* * * * *